United States Patent [19]
Filion

[11] Patent Number: 5,225,214
[45] Date of Patent: Jul. 6, 1993

[54] LATERALLY ADJUSTABLE DIVIDER WALL FOR MOLDING TWO COLOR SHELLS

[75] Inventor: Scott Filion, Newmarket, N.H.

[73] Assignee: Davidson Textron Inc., Dover, N.H.

[21] Appl. No.: 884,932

[22] Filed: May 18, 1992

[51] Int. Cl.⁵ .................. B29C 41/04; B29C 41/22
[52] U.S. Cl. .................. 425/434; 249/131; 264/245; 264/310; 264/DIG. 60; 425/435
[58] Field of Search .......... 264/245, 255, 301, 302, 264/310, DIG. 60; 249/131; 425/130, 256, 257, 425, 434, 435, 447, 448

[56] References Cited

U.S. PATENT DOCUMENTS

| | | | |
|---|---|---|---|
| 3,123,403 | 3/1964 | Hood | 297/412 |
| 4,562,025 | 12/1985 | Gray | 264/126 |
| 4,610,620 | 9/1986 | Gray | 425/434 |
| 4,623,503 | 11/1986 | Anestis | 264/302 |
| 4,664,864 | 5/1987 | Wersosky | 264/301 |
| 4,925,151 | 5/1990 | Gray | 425/434 |
| 5,033,954 | 7/1991 | Kargarzadeh | 425/434 |
| 5,046,941 | 9/1991 | Batchelder et al. | 425/434 |
| 5,074,773 | 12/1991 | Tischler | 425/134 |

Primary Examiner—Jay H. Woo
Assistant Examiner—James P. Mackey
Attorney, Agent, or Firm—Reising, Ethington, Barnard, Perry & Milton

[57] ABSTRACT

An assembly (10) for molding a two-tone color plastic shell (12) includes a divider wall (42) having first and second sections (42a) and (42b) that are interconnected for lateral adjustment therebetween for controlling the position of a seal gasket (60) with respect to a divider rib or division surface (36) on a heated mold (22).

6 Claims, 2 Drawing Sheets

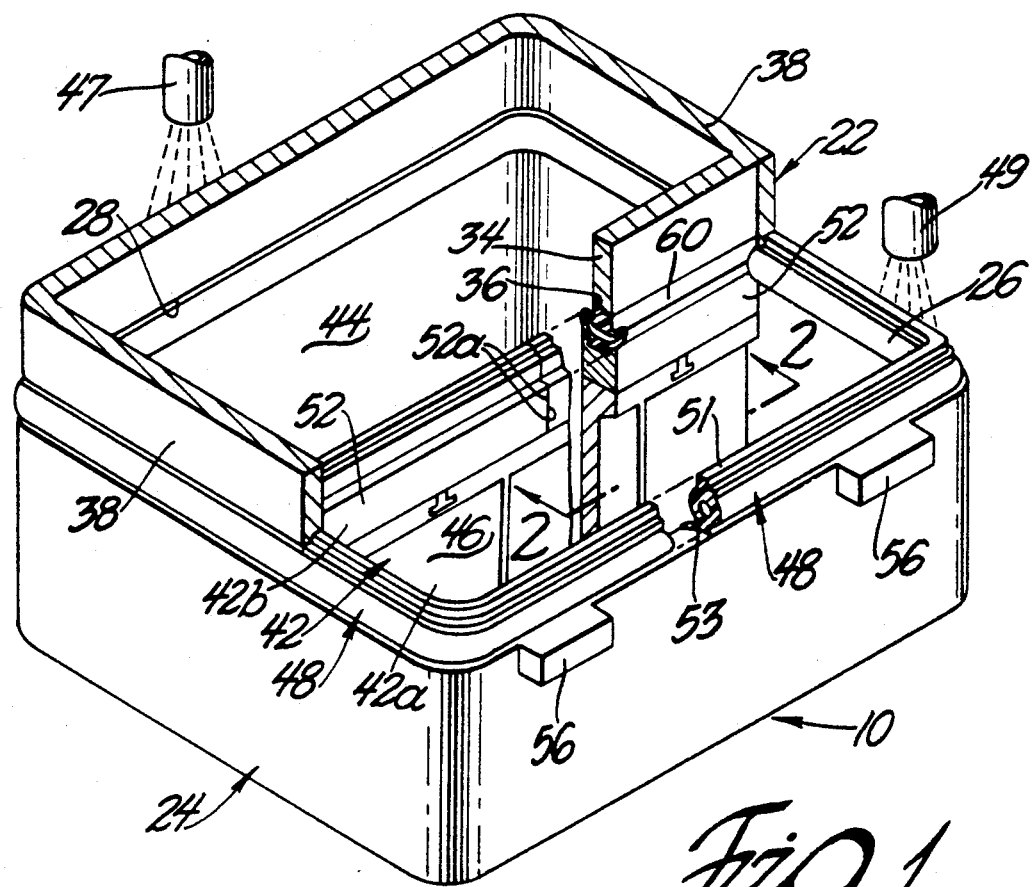
*Fig.1*
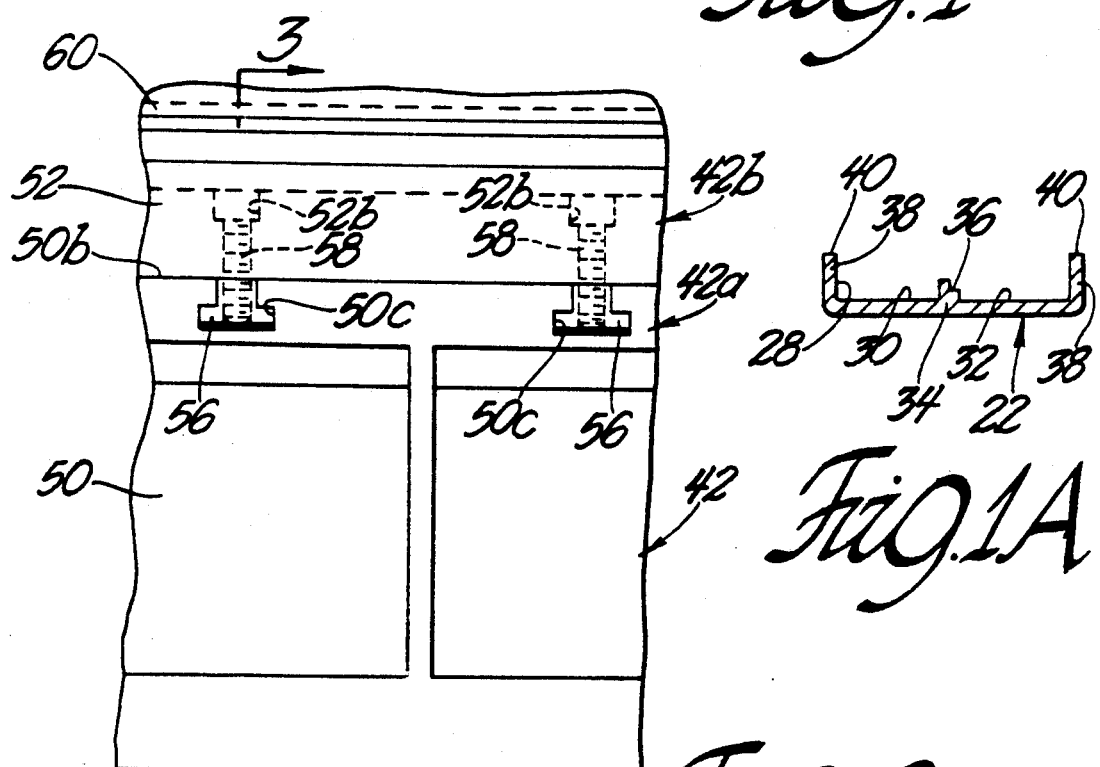
*Fig.1A*  *Fig.2*

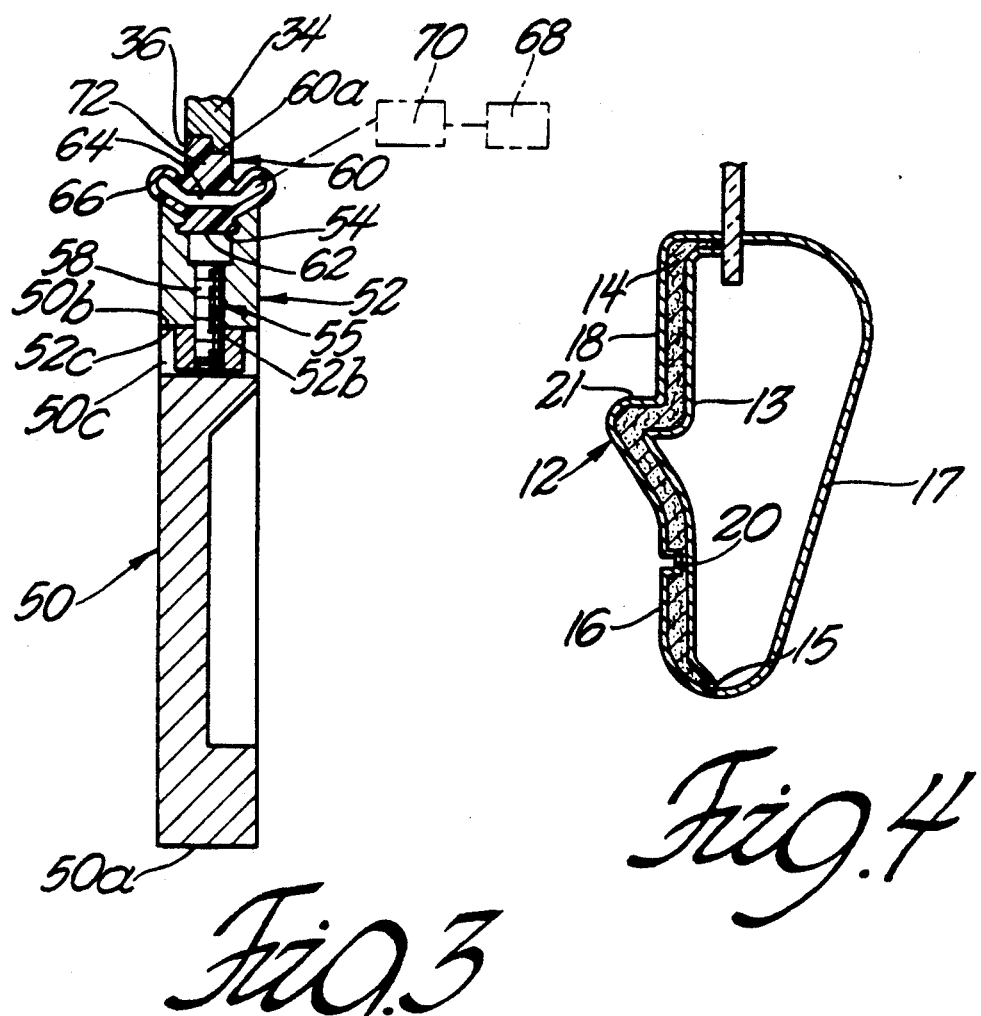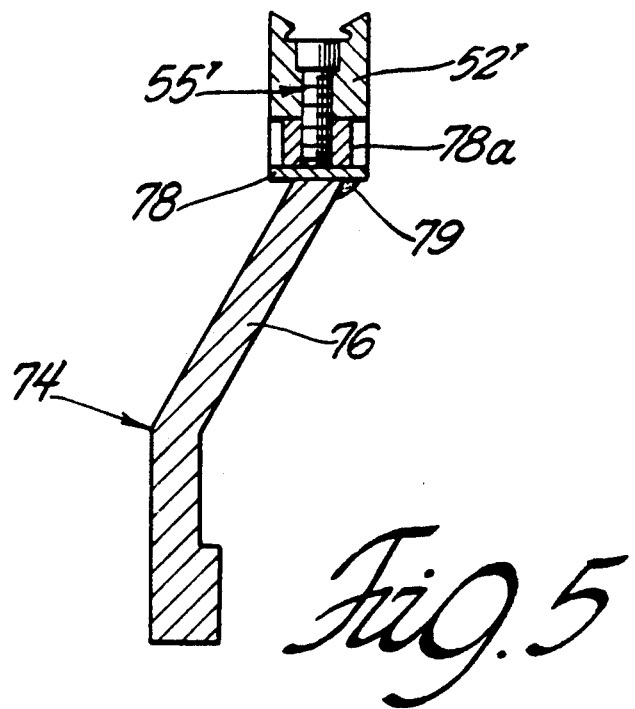

LATERALLY ADJUSTABLE DIVIDER WALL FOR MOLDING TWO COLOR SHELLS

TECHNICAL FIELD

The invention relates to an apparatus for making thin plastic shells especially suitable for use in automobile trim components, such as interior door or instrument panels, and more particularly to two plastic shells having an integrally bonded connector joining the color section at a bond joined therebetween.

BACKGROUND OF THE INVENTION

The automotive industry has turned to the use of interior trim components, such as door panels, comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desirable, particularly in the interior design of automobiles.

The current state of the art includes a preformed grain vinyl shell made from dried thermoplastic powder particles which are applied to a heated shell mold from a powder box to form a continuous one-piece shell.

In order to enhance the interior decor of an automobile, interior door panels and other parts have been prepared which include two separate plastic shell sections joined by a mechanical fastener.

U.S. Pat. No. 4,562,025 issued Dec. 31, 1985, with a common assignee to this present invention, covers a mold method and apparatus for multi-color plastic shells which shell segments have their edges bonded at a particular break-line.

U.S. Pat. No. 4,610,620, issued Sep. 9, 1986, discloses an apparatus for loading and releasing a recharge of two or more colors of thermoplastic color from separate compartments in a charge box for gravity flow into a mold configured to produce two shell segments and a separate overlapping color connector to bond the shell segments to form a one piece shell with two or more color tones to enhance the color of the interior of an automobile. An open-ended charge box is provided with a divider wall to form two separate compartments, each filled with a predetermined quantity of different powder. The mold has a division surface which cooperates with the divider wall to separate the powder content in each compartment of the charge box. The charge box releases the powder from the separate charge box compartments to flow evenly across the open end of the mold by gravity. A fixed gasket seals the division surface and the divider wall so as to produce separate two-tone segments on the heated surfaces of the mold. In theory, the seal gasket keeps the division surface clean for a subsequent application of the material thereagainst to form a connector that bonds the previously cast two-tone segments to form a single piece article with an integral joint between the two-tone segments. In practice, such a fixed gasket must conform to a division surface on each of a number of heated molds. The molds can be heated by suitable means such as hot air units of the type shown in U.S. Pat. No. 4,623,503 dated Nov. 18, 1986. Tolerance differences in the mold dimensions may leave margin gaps between the fixed gasket and the division surface. Powder from the charge box can seep into such gaps onto the division surface to create color smudges in the finish bond connector.

A further assembly utilized by the assignee of the subject invention includes an inflatable seal gasket which is operative to selectively bridge between the divider wall and the division surface when a charge box and heated mold are connected together. The inflatable seal includes a sealing bead thereon configured to completely cover the division surface to prevent seepage of the powder material from the casting surfaces to the division surface and to prevent resulting color smudges in a subsequently formed connector bond. The assembly solves the prior art problem of seepage onto the division surface due to geometric shape by inflating the gasket. However, a problem with this type of seal gasket is that the gasket is slidable along the divider wall and is allowed to slide therealong at any time preceding and during the casting operation. The seal gasket may drift and slide out of longitudinal alignment with the division surface and divider wall over a period of time causing leakage or other failures of the gasket and scrap shells.

In U.S. Pat. No. 5,074,773 which is incorporated herein by reference and commonly assigned with this application, an assembly is provided for molding a two-tone, thin-walled plastic shell in a heated open-ended mold from a charge of thermoplastic powder material in an open-ended charge box. The assembly includes a heated open-ended mold having a rib extending therefrom establishing two separate casting surfaces thereabout, a charge box adapted to be connected to the heated open-ended mold in open-ended relationship to form a closed system for casting the powder material and having a divider wall establishing two sources of the powder material. Also included is a seal gasket means longitudinally slidable along the divider wall for selectively bridging between the divider wall and the rib when the heated open-ended mold and the charge box are connected in the closed system. The assembly is characterized by including retaining means selectively secured to said divider wall for receiving and maintaining the sealed gasket means at a predetermined position longitudinally along the divider wall. The seal gasket is held longitudinally to prevent damage thereto during manufacturing of the thin-walled hollow shells and also to prevent damage to shells formed with respect to the gasket.

One problem with each of the aforesaid casting assemblies is that the divider wall is a one piece member for retaining the sealing gasket with respect to the divider rib or division surface on the heated mold. In certain applications the divider wall is a cast or machined aluminum part. In other applications the divider wall is a fiberglass reinforced epoxy panel having a cast seal retainer member directly fixed to the end of the panel by suitable fasteners such as bolts. The only lateral adjustment of the divider wall to compensate for dimensional variations between the sealing gasket and the divider rib is to reposition the entire divider wall or to bend it with respect to the walls of the charge box so as to relocate the sealing gasket into better alignment with the divider rib or division surface when the charge box and heated open ended mold are joined together in an open-ended relationship. Such adjustment will not provide the desired accuracy required in most assemblies for casting accurately formed two color shells with a precision joint formed therebetween.

SUMMARY OF THE INVENTION AND ADVANTAGES

The invention is an assembly of the type set-forth in the above referenced U.S. Pat. No. 5,074,773 that is modified to include an adjustable divider wall including a first area defining a solid wall panel and a second area including several individual sections that can be moved side to side or laterally of the solid wall panel or shimmed with respect to the solid wall panel for adjusting the positions of the individual sections with respect to the divider rib on the heated mold. The combination of lateral adjustability and shimming provides significantly more gasket movement to compensate for dimensional variations between a plurality of different heated molds that are connected at different times to the charge box during a manufacturing run. It has been found that such molds formed as thin electroformed metal such as nickel alloy can have dimensional variations mold to mold and further can have variations in rib position thereon due to electroform surface movement during the heating and connection phases of the manufacturing process.

The present invention provides for mating a single gasket and retainer design to a divider wall. A feature of the invention is that the individual sections in the second area are individually cast aluminum parts pressed or machined in a one-piece construction. Each of the sections is bolted down by a fastener system including a T-nut in a lateral slot formed at an upper end of the solid wall panel defining the first area and further including a bolt fastened within a one-piece construction, individual section, that is adjustable relative to the solid panel. The individual sections can be loosened and repositioned in laterally adjusted and shimmed locations as required and for loosening the individual sections for subsequent adjustment to fit the dimensions of other heated mold sections either laterally or vertically with respect to the a divider surface on a heated mold.

One object of the present invention is to improve the rigidity of a divider wall component within a charge box while providing an easily adjusted positioning thereof with respect to a heated mold during processing.

A further object is to improve such rigidity and adjustability in an assembly for molding a two-tone thin-walled plastic shell in a heated open-end mold from a charge of thermoplastic powder material deposited on an open ended charge box and wherein the heated open-ended mold has a rib extending thereacross separating first and second casting surfaces from each other and wherein the charge box is adapted to be connected to the heated open-end mold in open-ended relationship to form a closed system for casting the powder material and further including a divider wall having a gasket thereon engageable with the rib for sealing two sources of powder material by the provision of: a divider wall having a first section formed as a solid panel and further having an individual second section; the first and second sections joined together at an interface therebetween; a gasket means connected to the second section for sealing against the rib when the heated open-end mold and the charge box are in their connected open ended relationship; and by the further provision of a fastener system for interconnecting the first and second sections for lateral and vertical movement therebetween for positioning the gasket means both in a laterally and vertically adjusted position with the rib for compensating for dimensional variations between the rib and the divider wall.

A further object is to improve the assembly of the preceding object wherein the fastener system includes at least one slot formed in the solid panel section and a fastener supported within the individual first section and including a portion thereon mounted within the slot for preventing separation at an interface between the first and second sections.

Still another object of the invention is to provide the assembly of the preceding objects wherein adjustability is provide by including a slot in one of the sections and by further providing a first fastener component slidably mounted within the slot for lateral movement therein and a second fastener component carried by the other of the sections for threadable connection with the first fastener component and the first and second fastener components operatively connected with respect to the first and second sections for loosely connecting the first and second sections whereby the first and second sections can be laterally adjusted relative to one another; and wherein the first and second fastener components are operative to lock the first and second sections at an interface therebetween following lateral and vertical adjustment thereof.

Yet another feature of the present invention is to provide the assembly of the preceding objects wherein the first and second sections include a slot in which a nut is slidably mounted for lateral movement therein and a bolt is carried by one of the sections for threadably connection with the nut; the nut and bolt being operatively connected with respect to the first and second sections for loosely connecting them at an interface whereby the first and second sections can be laterally adjusted relative to one another; and the nut and bolt being operative to lock the first and second sections at the interface therebetween following lateral adjustment thereof.

BRIEF DESCRIPTION OF THE DRAWINGS

Other advantages of the present invention will be readily appreciated as the same become better understood by reference to the following detailed description when considered in connection with the accompanying drawings wherein:

FIG. 1 is a perspective view of a heated mold joined to a charge box and seal assembly of the subject invention with the heated mold having its casting surfaces broken away;

FIG. 1A is a reduced sectional view of the heated mold showing its casting surfaces;

FIG. 2 is a fragmentary side elevational view of a charge box divider wall taken along line 2—2 of FIG. 1 looking in the direction of the arrows;

FIG. 3 is a sectional view of the divider wall of FIG. 2 along lines 3—3 looking in the direction of the arrows;

FIG. 4 is a sectional view of a two-tone part made by the apparatus of the present invention; and FIG. 5 is a sectional view of seal and retaining means in a second embodiment of the invention.

DETAILED DESCRIPTION OF THE PREFERRED EMBODIMENT

An assembly 10 for molding a two-tone, thin-walled plastic shell 12 from a charge of thermoplastic powder material is generally illustrated in FIGS. 1 and 2.

The assembly 10 may process a variety of hollow shell parts. FIG. 4 illustrates a typical automobile door panel application of a multi-color, single piece interior plastic shell 12. The assembly 10 is equally suitable for making other interior parts such as instrument panel covers and the like. The shell 12 is preferably made of polyvinyl chloride material and is backed by a layer of polyurethane foam 14 bonded to the shell 12 by a mold process such as in U.S. Pat. No. 3,123,403, issued Mar. 3, 1964, for automobile armrest. An interior reinforcing insert 13 is connected at a joint 15 to an outer door panel 17 to form an interior space for a window lift mechanism (not illustrated) to raise and lower a window.

The shell 12 is a plastic part with an integral lower panel 16 of a dry castable thermoplastic material of a first color and upper panel 18 of a dry castable thermoplastic material of a second color. The shell 12 includes a bonded connector 20 of a selected color that overlaps the lower panel 16 and upper panel 18. The connector 20 is bonded to the lower panel 16 and the upper panel 18. The upper panel 18 can include an armrest segment 21 formed by a dry castable thermoplastic material having a second color contrasting or complimenting the color of the lower panel 16 or other interior components. For example, the upper panel 18 can be red, blue, yellow or beige to contrast with or complement the interior color of the seats, headliners, crash pads and the like. The lower panel 16 can be colored a deeper complimentary two-tone color of a character which has a low impact or scuff resistant qualities. The bonded connector 20 can be a color complimentary to the colors of the lower panel 16 and upper panel 18 or the same as one or the other of the panels 16, 18.

The assembly 10 includes a heated open-ended mold 22. A charge or powder box 24 is operated between raised and lowered positions with respect to the mold 22 by suitable handling equipment, exemplified by the type set forth in U.S. Pat. No. 4,664,864. The charge box 24 includes an open end 26 which is configured to cover the planar extent of an opening 28 of the mold 22. Each of the molds 22 is coupled to the powder box 24 by clamping systems (not shown) but of the type shown in U.S. Pat. No. 5,074,773. The coupling occurs once the respective mold 22 has been heated to a casting temperature by suitable heating means.

The heated mold 22 includes a pair of casting surfaces 30, 32 separated by a raised rib 34 therebetween, all as shown in FIG. 1A (cut away in FIG. 1). The rib 34 has a stepped division surface 36 that extends between two of the spaced side walls 38 of the mold 22.

The rib 34 is located below the open edge of the surfaces 40 of the walls 38 of the mold 22. In the illustrated example of the assembly 10, the upper edge surfaces 40 are shown in the same plane. It should be understood that these surfaces 40 may be of different levels depending upon the shape of the thin-walled shell 12 to be casted onto the heated mold 22.

The charge box 24 includes a divider wall assembly 42 constructed in accordance with the present invention to provide both lateral and vertical adjustment with respect to the division surface 36 on the raised rib 34. The divider wall assembly 42 separates the charge box 24 into first and second compartments 44, 46, each of which is configured to be filled with a charge of thermoplastic particles or powder material. FIG. 1 illustrates a fragmentary section of the mold 22 on the charge box 24 to illustrate the relationship thereto when sealed together for conducting a casting process. The charge in the charge box 24 is a dry thermoplastic material which will melt and bond together when cast against the heated surfaces 30, 32 of the mold 22. In order to maintain separation between the material and each of the compartments 44, 46, the height of the divider wall 42 is greater than the maximum depth of either of the compartments 44, 46. The compartments 44, 46 are filled from diagrammatically illustrated sources 47, 49 of different colors of thermoplastic material.

The charge box 24 further includes side wall gaskets 48. Each gasket 48 has a compression seal segment 51 with a base 53 connected to the upper ends of the side walls of box 24. The gaskets 48 seal the perimeter of the charge box 24 to the perimeter of the heated mold 22 when they are clamped together at outwardly directed wall flanges 56 by clamps.

As best shown in FIGS. 2 and 3, the divider wall assembly 42, in accordance with the present invention, is comprised of a solid wall panel 50 defining a first area 42a in the divider wall assembly 42 that is adapted to be integrally formed with the charge box 24 or connected at the base 50a thereof to the bottom of the charge box 24 so as to seal the first and second compartments 44, 46 from each other such that the different color powder will not be mixed. The solid wall panel 50 includes an upper end 50b thereon. A plurality of separated individual wall sections 52 are supported on the upper end 50b. Each of the individual wall sections 52 have a gasket retaining groove 54, as shown in FIG. 3, formed longitudinally of the wall sections 52. Further, each of the individual wall sections 52 have end surfaces 52a that abut to form a second area 42b in the divider wall assembly 42 that is adjustable both laterally and vertically with respect to the walls of the charge box 24. Adjustment is provided by a fastener system 55 that is connected between the solid wall panel 50 and the individual wall sections 52 so as to control the position of a seal gasket 60 with respect to the divider rib 34. The dual adjustment enables the seal gasket 60 to have a stepped surface 60a thereon properly aligned with and sealed against the division surface 36 when the charge box 24 is connected in sealed relationship with the heated mold 22.

Specifically, the fastener system 55 includes a plurality of T-slots 50c formed in the upper end 50b of the solid wall panel 50. The T-slots 50c each carry a T-nut 56 slidably mounted for lateral movement with respect to the upper end 50b. The T-nuts 56 each are threadably connected to a bolt 58 carried within a stepped bore 52b in one of the individual wall sections 52. In order to provide vertical adjustment the individual wall sections 52 are loosely connected to the upper end 50b of the solid wall panel 50 and a shim (not shown) is located between the upper end 50b and the lower surface 52c of the individual wall sections 52. Lateral adjustment is made by moving the connected bolt and T-nuts 56 laterally within the T-slots 50c so as to adjust the lateral position of the individual wall sections 52 on the upper end 50b. The bolts 58 are then tightened within the T-nuts 56 to draw the individual wall sections 52 tightly against the upper end 50b of the solid wall panel 50. Thereafter the gasket 60 is replaced in a longitudinal gasket retainer groove 54 following proper alignment of the stepped surface 60a thereon with the stepped division surface 36 of the rib 34.

Once the powder box 24 and mold 22 are clamped together, the side wall seals 48 prevent the escape of the powder material from the closed casting system which is rotated by drive means about an axis of rotation to distribute the layer of first and second colored particles of thermoplastic material on the surfaces. The seal 60 can be inflated during such casting to prevent the flow of different colored particles between compartments 44, 46 and onto the division surface 36.

The inflatable seal 60 is configured to accomplish several objectives. The inflatable seal 60 includes a base 62 connectable to the divider wall assembly 42 in fixed sealing engagement therewith to seal along the length thereof and to provide a structural base for operation between deflated and inflated positions. The divider wall 42 has a dove-tail groove 54 to receive the base 62 of the seal 60.

The seal 60 also can have a hollow core 64 with walls 66 which expand and contract when the core 64 is inflated. Such inflation occurs when the core 64 is selectively connected to a source of pressure 68 by suitable valve control means 70. The seal 60 includes a sealing bead 72 which is held in pressure biased sealing relationship with the division surface 36 during the casting operation.

The sealing bead 72 has the stepped surface 60a thereon which completely covers the division surface 36 when the seal 60 is inflated. Consequently, there are no edge gaps or seepage of the powder material from either of the compartments 44, 46 onto the division surface 36 during the casting operation.

When the seal 60 is in its deflated or retracted position, a gap remains between the sealing bead 72 and the division surface 36. In order to bridge the gap and compensate for dimensional tolerance difference in the height of the rib 34 on different molds 22, the hollow core 64 is pressurizeable to expand the walls 66. FIG. 2 shows the inflatable seal 60 in its inflated or expanded position in which the sealing bead 72 is sealingly located on the division surface 36.

The division surface 36 remains covered during the casting process. Consequently, the division surface 36 is clean when the mold 22 is separated form the powder box 24.

In operation, solid wall panel 50 and individual wall sections 52 are loosely connected by the fastener system 55, the seal 60 is placed within the dove-tail groove 54. The individual wall sections 52 are then positioned laterally along the divider wall assembly 42 such that the seal 60 is position accurately laterally along the charge box 24. If required, shims are inserted to adjust the vertical height of the individual wall sections by inserting them as required between panel 50 and wall sections 52. The gasket, once properly positioned, is removed. The bolts 58 are tightened in the T-nuts 56 within the T-slots 50c to secure the divider wall assembly 42 at an adjusted position where the seal 60 is at a desired position to compensate for tolerance differences between components, including charge box dimensions, mold dimensions and changes produced during heating and connection within the process. The seal 60 will remain at the predetermined position as long as attached and secured to the adjustable divider wall assembly 42. If the seal 60 is removed, reinsertion of the seal 60 will ensure proper positioning of the seal 60 at the predetermined position.

Following the casting operation, a thin wall of material is formed on each casting surface 30, 32 to form separate colored segments 16, 18 such as panels described above. A separate bonding layer of thermoplastic material is then applied to the surface 36 in a known manner by suitable means including paint or rolling a wet slurry of a suitable thermoplastic material or by dry casting the bonding thereon. A resultant bonded connected 20 is then formed to bridge the gap between the color segments 16, 18 and to bond the segments 16, 18 into one integral part with a precision styling line therebetween while the segments remain in the mold. The final product is removed from the mold as an integral unit.

A second embodiment of the invention is shown in FIG. 5. It includes a divider wall assembly 74 having an inclined solid panel 76. A bar 78 is welded at 79 along its length to connect to the solid panel 76. The bar 78 includes T-slots 78a that receive a fastener system 55' corresponding to system 55 for connecting a plurality of wall sections 52' for lateral and vertical adjustment as described in the embodiment of FIGS. 2 and 3.

A typical powder casting process for a two color door panel includes the following sequence:
1. preheat mold 22 tool;
2. attach the powder box 24 to the mold 22 when it attains casting temperature to melt the thermoplastic material;
3. rotate charge box 24 and mold 22 to form separate cast segments 16, 18 of two-tone colors;
4. dwell;
5. unclamp:
6. distribute connector bond material against clean, heated division surface;
7. return the mold 22 to a cure oven (or it is heated by hot air by an air processing unit) to fuse connector end to two-tone segments.

Further description of such a process is set forth in the aforementioned '620 patent. Suitable thermoplastic casting material includes plasticized polyvinyl chlorides and related vinyl resins in dry powder form or in liquid slurry form for ease of gravity flow from the powder charge box 24 during the casting steps. Typical examples of parts, plastic material and mold processes include the following: PVC resin, plasticizer, stabilizer, release agents and color pigments are combined in a high intensity mixer to produce a dry, flowable powder of each desired color. The process is known in the industry as dry-blending.

The various component constituents may be selected as to type and ratio to provide the properties required both for the finished product and for ease of processing. Physical properties will not be too dissimilar from those obtained with liquid plastisol which is also used to manufacture similar products but has an inherent tendency to force objectionable drips and runs when used to make complex shapes.

Processing properties are such that when melting of the plastic powder occurs, densification results in exact reproduction of minute details such as grains, marks and stitches engraved or formed in the mold surface.

Mold preheating temperatures may range from 250° F. to 450° F. Since the thickness of the finished product is also governed by the time the powder is in contact with the mold, it should be understood that simultaneous charging of the powder to the mold can be a definite advantage. Also, if certain areas of the mold can be made to have a lower preheated temperature than others, it will permit molding a thinner shell in those areas, since temperature and mold-filled time determine the final thickness of the shell. Therefore, a very flexible range for mold-filled time of one second to ten seconds or more has been established.

Depending on formulation, complete melting or fusion of the PVC powder can occur when mold temperatures reach 350° F. to 450° F. After fusion, the mold is cooled to a temperature which will facilitate removal of the shell without damage. Specifically, the process and apparatus of the present invention provides even and complete distribution of thermoplastic powder material onto mold surfaces to form large, long, thin-walled, single piece two color or more shells with the pin stripe or common color connector bond to each shell segment for forming a unitary part for interior door panels or instrument panels and the like formed during short cycle mold cycles in limited plant floor space.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An assembly for molding a two-tone thin-walled plastic shell in a heated open-end mold from a charge of thermoplastic powder material in an open ended charge box and wherein the heated open-end mold has a rib extending thereacross separating first and second casting surfaces from each other and wherein the charge box is adapted to be connected to the heated open-end mold in open-ended relationship to form a closed system for casting the powder material and further including a divider wall having a gasket means thereon engageable with the rib for sealing two sources of powder material from one another;

said divider wall having first and second sections joined together at an interface therebetween; said gasket means being connected to said first section for sealing against said rib when the heated open-end mold and the charge box are in their connected open ended relationship; and means interconnecting said first and second sections for lateral movement therebetween for positioning said gasket means in a laterally adjusted position with said rib for compensating for dimensional variations between said rib and said divider wall.

2. An assembly for molding a two-tone thin-walled plastic shell in a heated open-end mold from a charge of thermoplastic powder material in an open ended charge box and wherein the heated open-end mold has a rib extending thereacross separating first and second casting surfaces from each other and wherein the charge box is adapted to be connected to the heated open-end mold in open-ended relationship to form a closed system for casting the powder material and further including a divider wall having a gasket means thereon engageable with the rib for sealing two sources of powder material from one another;

said divider wall having first and second sections joined together at an interface therebetween; said gasket means being connected to said first section for sealing against said rib when the heated open-end mold and the charge box are in their connected open ended relationship; and means interconnecting said first and second sections for lateral movement therebetween for positioning said gasket means in a laterally adjusted position with said rib for compensating for dimensional variations between said rib and said divider wall;

said means interconnecting said first and second sections including at least one slot formed in one of said first and second sections and a fastener supported within the other of said first and second sections and including a fastener portion mounted within said slot for preventing vertical separation at said interface between said first and second sections.

3. In the assembly of claim 1, said means interconnecting said first and second sections including a slot in one of said sections; a first fastener means slidably mounted within said slot for lateral movement therein and a second fastener means carried by the other of said sections for threaded connection with said first fastener means; said first and second fastener means connected to said first and second sections for loosely connecting said first and second sections whereby said first and second sections are laterally adjustable relative to one another; and said first and second fastener means being adaptable to lock said first and second sections at the interface therebetween following lateral adjustment thereof.

4. In the assembly of claim 1, said means interconnecting said first and second sections including a T-slot in one of said sections; a nut slidably mounted within said T-slot for lateral movement therein and a bolt carried by the other of said sections for threaded connection with said nut; said nut and bolt are connected to said first and second sections for loosely connecting said first and second sections whereby said first and second sections are laterally adjustable relative to one another; and said nut and bolt are adaptable to lock said first and second sections at the interface therebetween following lateral adjustment thereof.

5. In the assembly of claim 2, said means interconnecting said first and second sections including first fastener means slidably mounted within said slot for lateral movement therein and a second fastener means carried by the other of said sections for threaded connection with said first fastener means said first and second fastener means being connected to said first and second sections for loosely connecting said first and second sections whereby said first and second sections are laterally adjustable relative to one another; and said first and second fastener means are adaptable to lock said first and second sections at the interface therebetween following lateral adjustment thereof.

6. In the assembly of claim 2, said means interconnecting said first and second sections including a T-slot in said second section; a nut slidably mounted within said T-slot for lateral movement therein and a bolt carried by said first section for threaded connection with said nut; said nut and bolt being connected to said first and second sections for loosely connecting said first and second sections whereby said first and second sections are laterally adjustable relative to one another; and wherein said nut and bolt are adaptable to lock said first and second sections at the interface therebetween following lateral adjustment thereof.

* * * * *